US012492361B2

(12) United States Patent
Xie et al.

(10) Patent No.: US 12,492,361 B2
(45) Date of Patent: Dec. 9, 2025

(54) SUGAR GRANULE CLOTHING AROMA-ENHANCING BEAD COMPOSITION AND METHOD FOR PREPARING SAME

(71) Applicant: Guangzhou Liby Enterprise Group Co., Ltd., Guangdong (CN)

(72) Inventors: Songou Xie, Guangdong (CN); Yujie Ma, Guangdong (CN); Yong Luo, Guangdong (CN); Bing Shen, Guangdong (CN); Liping Zhang, Guangdong (CN)

(73) Assignee: Guangzhou Liby Enterprise Group Co., Ltd., Guangzhou (CN)

( * ) Notice: Subject to any disclaimer, the term of this patent is extended or adjusted under 35 U.S.C. 154(b) by 315 days.

(21) Appl. No.: 18/038,718

(22) PCT Filed: Sep. 29, 2021

(86) PCT No.: PCT/CN2021/121700

§ 371 (c)(1),
(2) Date: May 25, 2023

(87) PCT Pub. No.: WO2022/127282

PCT Pub. Date: Jun. 23, 2022

(65) Prior Publication Data

US 2024/0034965 A1 Feb. 1, 2024

(30) Foreign Application Priority Data

Dec. 14, 2020 (CN) ......................... 202011470620.3

(51) Int. Cl.

*C11D 7/26* (2006.01)
*C11D 3/50* (2006.01)
*C11D 7/20* (2006.01)
*C11D 7/36* (2006.01)

(52) U.S. Cl.

CPC .............. *C11D 7/268* (2013.01); *C11D 3/505* (2013.01); *C11D 7/20* (2013.01); *C11D 7/265* (2013.01); *C11D 7/36* (2013.01)

(58) Field of Classification Search

CPC ........... C11D 3/50; C11D 3/502; C11D 3/505; C11D 7/329; C11D 9/442; C11D 2111/12
See application file for complete search history.

(56) References Cited

U.S. PATENT DOCUMENTS

| | | | | |
|---|---|---|---|---|
| 4,234,627 A | | 11/1980 | Schilling | |
| 4,514,461 A | | 4/1985 | Woo | |
| 4,882,220 A | | 11/1989 | Ono et al. | |
| 4,917,920 A | | 4/1990 | Ono et al. | |
| 6,200,949 B1 | | 3/2001 | Reijmer et al. | |
| 6,645,479 B1 | | 11/2003 | Shefer et al. | |
| 2003/0158344 A1 | | 8/2003 | Rodriques et al. | |
| 2003/0165692 A1 | | 9/2003 | Koch et al. | |
| 2003/0195133 A1 | | 10/2003 | Shefer et al. | |
| 2003/0203829 A1 | | 10/2003 | Shefer et al. | |
| 2003/0215417 A1 | | 11/2003 | Uchiyama et al. | |
| 2003/0216488 A1 | | 11/2003 | Uchiyama et al. | |
| 2004/0071742 A1 | | 4/2004 | Popplewell et al. | |
| 2004/0071746 A1 | | 4/2004 | Popplewell et al. | |
| 2004/0072719 A1 | | 4/2004 | Bennett et al. | |
| 2004/0072720 A1 | | 4/2004 | Brain et al. | |
| 2004/0087477 A1 | | 5/2004 | Ness | |
| 2004/0106536 A1 | | 6/2004 | Mane et al. | |
| 2011/0097369 A1 | * | 4/2011 | Sunder | C11D 3/505 510/513 |
| 2012/0165239 A1 | * | 6/2012 | Dreja | C11D 3/3753 510/516 |
| 2019/0144779 A1 | * | 5/2019 | Pelletier | C11D 3/124 512/4 |
| 2022/0119743 A1 | * | 4/2022 | Barros | C11D 3/10 |

FOREIGN PATENT DOCUMENTS

| | | |
|---|---|---|
| CN | 1934277 A | 3/2007 |
| CN | 107173507 A | 9/2017 |
| CN | 110760395 A | 2/2020 |
| EP | 1393706 A1 | 3/2004 |

OTHER PUBLICATIONS

International Search Report of PCT Patent Application No. PCT/CN2021/121700 issued on Jan. 4, 2022.

* cited by examiner

*Primary Examiner* — Charles I Boyer

(57) ABSTRACT

A clothing aroma-enhancing bead composition and a method for preparing same are provided. The clothing aroma-enhancing bead composition includes the following raw materials in percentage by weight: 60-95% of sugar granules, 1.0-20% of liquid essence, and 0.5-20% of silica. The clothing aroma-enhancing bead composition takes the sugar granules as a core, and surfaces of the sugar granules are coated with the liquid essence and the silica. The clothing aroma-enhancing bead composition is attractive in appearance, good in solubility, and simple in production process.

6 Claims, No Drawings

SUGAR GRANULE CLOTHING AROMA-ENHANCING BEAD COMPOSITION AND METHOD FOR PREPARING SAME

TECHNICAL FIELD

The present invention relates to a clothing aroma-enhancing bead composition, and in particular to a clothing aroma-enhancing bead that is added in a washing process and is attractive in appearance.

BACKGROUND

With the improvement of people's living standard, higher demands for fabric care products have been put forward by consumers. The consumers not only want clothing to be clean and tidy, but also want lasting pleasant aromas left on washed clothing. Clothing aroma-enhancing products are designed to meet such demands. At present, a variety of clothing aroma-enhancing products have been sold on the market, and a current mainstream technical solution includes using polyethylene glycol (PEG) as a carrier. A PEG-based aroma-enhancing product is hemispherical in appearance and waxy in luster, which can be added with laundry detergent in a washing stage. Compared with a softener added in a rinsing stage, the product is more convenient. In addition, the negative impact of "chemical residues" caused to the consumers in the washing stage is avoided. Thus, in recent years, the product has been rapidly developed and slowly replaced the softener in a part of market shares. However, the technical solution of using the PEG as a carrier has the following obvious shortcomings that are difficult to overcome: poor solubility, high cost, large investment in production equipment and complex process.

Therefore, an alternative solution of using the PEG as a carrier is required urgently to make improvement based on the shortcomings of the prior art, and the new solution is expected to produce a product that is attractive in appearance, low in cost, simple in equipment and process and good in aroma retention.

SUMMARY

In view of the technical problems to be solved that clothing aroma-retaining beads using PEG as a carrier have poor solubility, high cost, large investment in production equipment and complex process, the present invention provides a novel clothing aroma-retaining bead composition capable of replacing the PEG carrier.

The present invention provides a clothing aroma-enhancing bead composition. The clothing aroma-enhancing bead composition includes the following components in percentage by weight: 60-90% of sugar granules, 1.0-20% of liquid essence, and 0.5-20% of silica. The clothing aroma-enhancing bead composition is regular spherical in appearance and takes the sugar granules as a ball core, and surfaces of the sugar granules are coated with the liquid essence and the silica.

In a further technical solution, the sugar granules are spherical granules with a diameter of 1-4.0 mm, and are prepared from the following components in percentage by weight: 10-30% of a sugar core, 20-60% of an adhesive, and 20-50% of a sugar powder.

In a further technical solution, the sugar core is optionally selected from any composition of one or more of sucrose, glucose and sodium citrate.

In a further technical solution, the adhesive is optionally selected from an aqueous solution of a composition of one or more of sucrose, glucose, glucose syrup and maltose syrup.

In a further technical solution, the sugar powder is optionally selected from a composition of one or more of starch, sucrose, glucose and maltodextrin.

In a further technical solution, the clothing aroma-enhancing bead composition further includes, in percentage by weight, 0.1-2% of mineral oil.

A kinematic viscosity of the mineral oil at 40° C. is 1-30 $mm^2/s$, preferably 5-25 $mm^2/s$.

In a further technical solution, the clothing aroma-enhancing bead composition further includes, in percentage by weight, 0.1-5% of disodium hydroxyethylidene diphosphonate (HEDP-2Na).

In a further technical solution, the clothing aroma-enhancing bead composition further includes, in percentage by weight, 0.1-10% of microcapsule essence wrapped with a fragile hydrophobic material.

The present invention further provides a method for preparing the clothing aroma-enhancing bead composition. The method includes adding the sugar granules to a mixing and stirring pot in proportion, putting the liquid essence for uniform stirring, and then adding the silica for stirring until no powder obviously exists.

In a further technical solution, the sugar granules are prepared by a rotary coating pot device.

Compared with the prior art, the present invention has the following advantages that the clothing aroma-enhancing bead composition provided by the present invention takes the sugar granules as a carrier, an aroma-retaining bead prepared has an attractive spherical appearance, the sugar granules have natural raw materials and good compatibility with the essence, and the clothing aroma-enhancing bead composition has low cost, simple production process and low requirements for equipment.

The sugar granules used as a carrier in the present invention have natural, safe and reliable sources and a uniform and attractive regular spherical appearance. A product has the advantage of rapid dissolution in use, and loss caused by volatilization of the essence can be effectively reduced by a normal temperature loading process. The production process is safe, green and environmentally friendly, and the product has low requirements for process equipment, low cost of raw materials, high production capacity and market competitiveness.

DETAILED DESCRIPTION

The clothing aroma-enhancing bead composition and a method for preparing same of the present invention are further described in detail below in combination with specific embodiments.

The present invention provides a clothing aroma-enhancing bead composition. The clothing aroma-enhancing bead composition includes the following components in percentage by weight: 60-90% of sugar granules, 1.0-20% of liquid essence, and 0.5-20% of silica. The clothing aroma-enhancing bead is regular spherical and takes the sugar granules as a ball core, and surfaces of the sugar granules are coated with the liquid essence and the silica.

Various elements of the clothing aroma-enhancing bead composition of the present invention are described in detail below. Unless otherwise specified, all percentages, ratios and proportions used herein are calculated as the percentage by weight of the composition.

Unless otherwise specified, an "aroma-enhancing bead" used herein also means the "clothing aroma-enhancing bead composition".

Sugar Granules

The sugar granules are used as embellishments in baked foods and are prepared by a hard coating process for candies. First, small crystal granules with a certain size are screened out to serve as a sugar core; sugar and water are boiled at high temperature to obtain syrup as an adhesive; the syrup adhesive is evenly poured on the surface of the sugar core in a coating pot; after the sugar core and the syrup are evenly mixed, a sugar powder is added to make the surfaces of the granules evenly coated with the sugar powder; then, water is partially evaporated to make the granules have good fluidity; and the above coating process is repeated until granules with a predetermined size are obtained.

It is found creatively by the applicant that the sugar granules are very suitable for use as a carrier of an aroma-enhancing bead. By selecting the sugar granules with an appropriate size according to needs and making the essence attached to the surfaces of the granules, a uniform and attractive clothing aroma-enhancing bead can be obtained.

The sugar granules are spherical granules with a diameter of 1-4.0 mm, and are prepared from the following components in percentage by weight: 10-30% of a sugar core, 20-60% of an adhesive, and 20-50% of a sugar powder.

The sugar core is optionally selected from any composition of one or more of sucrose, glucose and sodium citrate; and in one of the embodiments, the sugar core is preferably glucose.

The adhesive is optionally selected from an aqueous solution of a composition of one or more of sucrose, glucose, glucose syrup and maltose syrup; and in one embodiment, the adhesive is preferably an aqueous solution of glucose and maltose syrup.

The sugar powder is optionally selected from a composition of one or more of starch, sucrose, glucose and maltodextrin.

Liquid Essence

Suitable essence may be selected as the liquid essence according to needs of target consumers of a product, and mixed liquid essence designed by a perfumer in an essence company is usually used. Performance of a top note, a middle note and a bottom note is adjusted by the perfumer according to use characteristics of the product to adjust a formula of the essence. In the clothing aroma-enhancing bead composition of the present invention, the added amount of the liquid essence is 1-20%.

Silica

The silica is used as adsorbent. The silica is a white amorphous powder whose chemical name is hydrated silica, and silica prepared by a vapor phase method or a precipitation method is suitable for the present invention. In the present invention, the added amount of the silica is 0.5-20%.

Mineral Oil

The clothing aroma-enhancing bead composition further includes, in percentage by weight, 0.1-2% of mineral oil, so as to make the product have a better appearance and luster. The mineral oil, also known as white oil, is a mixture of liquid hydrocarbons refined from petroleum, mainly including saturated cycloalkanes and alkanes. In the present invention, a kinematic viscosity of the mineral oil at 40° C. is 1-30 $mm^2/s$; and in some embodiments, the kinematic viscosity of the mineral oil at 40° C. is 5-25 $mm^2/s$.

Disodium Hydroxyethylidene Diphosphonate

The clothing aroma-enhancing bead composition further includes, in percentage by weight, 0.1-5% of disodium hydroxyethylidene diphosphonate, also called HEDP-2Na. The main effective component of the clothing aroma-enhancing bead related in the present invention is essence. A product with a high content of essence, the added amount of which is usually greater than 1%, has a high probability of yellowing at high temperature. However, the HEDP-2Na can significantly reduce the phenomenon of yellowing of the product, and can also make the product have good fluidity.

Microcapsule Essence

The clothing aroma-enhancing bead composition of the present invention further includes, in percentage by weight, 0.1-10% of the microcapsule essence wrapped with a fragile hydrophobic material. The microcapsule essence is obtained by wrapping essence with a specific material, and is intended to reduce loss of raw materials of the essence in production and washing processes, so as to make more essence deposited on the surface of clothing. The essence cracked by friction is usually wrapped with a hydrophobic resin, and a microcapsule is deposited on the clothing in the washing process. After the clothing is air-dried, an aroma is induced to release by friction of the microcapsule, and then a consumer can achieve an aroma-retaining effect continuously. Usually, the microcapsule is used in combination with the liquid essence to achieve a synergistic effect. The consumer first feels the liquid essence when collecting clothing. However, the liquid essence is lost and volatilized when being exposed for a long time, and the microcapsule can be used for remedying the defect of the liquid essence.

In the embodiments of the present invention, microcapsule products prepared by technologies in the following documents may be used: U.S. patent publications 2003215417A1, 2003216488A1, 2003158344A1, 2003165692A1, 2004071742A1, 2004071746A1, 2004072719A1, 2004072720A1, 2003203829A1, 2003195133A1, 2004087477A1 and 20040106536A1; U.S. Pat. Nos. 6,645,479, 6,200,949, 4,882,220, 4,917,920, 4,514,461 and 4,234,627; and reissued 32,713 and European patent publication EP1393706A1.

A method for preparing the clothing aroma-enhancing bead composition of the present invention includes the following steps:

adding the sugar granules to a mixing and stirring pot, putting the liquid essence for uniform stirring, and then adding the silica for stirring until no powder obviously exists. All the steps of the above method are carried out at room temperature without heating.

In some embodiments of the present invention, a pigment may be used and added at any stage. For example, the pigment may be mixed with water-soluble granules in advance or may be added after the water-soluble granules are coated.

In some embodiments of the present invention, other beneficial components such as mineral oil and disodium hydroxyethylidene diphosphonate are used. These components may be added and stirred evenly after the liquid essence is completely added, and then the adsorbent (silica) is added and continuously stirred.

Compared with the prior art, the present invention has the following beneficial effects. The product has a more attractive appearance favored by consumers, good solubility, a simple process and low cost.

Specific embodiments are described below. Unless otherwise specified, all raw materials used in the embodiments are commercially available products.

Table 1 provides the composition and percentage content of raw materials for production of sugar granules (sugar beads).

TABLE 1

| | Component (wt %) | Sugar beads 1 | Sugar beads 2 | Sugar beads 3 | Sugar beads 4 | Sugar beads 5 |
|---|---|---|---|---|---|---|
| Sugar core | Sucrose | / | / | 10 | 10 | 15 |
| | Glucose | 27 | 27 | / | 15 | / |
| | Sodium citrate | / | / | / | 5 | 15 |
| Adhesive | Sucrose | / | / | 6 | / | / |
| | Glucose | 21 | 21 | 20 | 21 | 20 |
| | Glucose syrup | 2 | / | 2 | / | 3 |
| | Maltose syrup | / | 2 | 2 | / | 4 |
| | Water | 17 | 17 | 21 | 17 | 17 |
| Sugar powder | Starch | / | 10 | 5 | 10 | 10 |
| | Sucrose | / | / | 10 | / | 12 |
| | Glucose | 29 | 19 | 20 | 12 | / |
| | Maltodextrin | 4 | 4 | 4 | 10 | 4 |

The above sugar granules are prepared by the following process: (1) uniformly stirring various components of a sugar powder in a horizontal mixer for later use; (2) mixing various components of an adhesive with water to obtain a mixture, and heating the mixture to 108° C. for boiling to obtain syrup for later use; and (3) adding a sugar core to a coating pot, starting the pot for rotation, adding the syrup, then scattering the sugar powder, conducting drying until dry sugar granules are obtained, then adding the syrup and the sugar powder for drying, and repeating the above processes continuously until sugar granules with a specified size are obtained.

Table 2 provides the composition and percentage content of raw materials for production of clothing aroma-enhancing beads in Examples 1-5.

TABLE 2

| Component (wt %) | Example 1 | Example 2 | Example 3 | Example 4 | Example 5 |
|---|---|---|---|---|---|
| Sugar beads 1 | 92 | / | / | / | / |
| Sugar beads 2 | / | 92 | / | / | / |
| Sugar beads 3 | / | / | 74.4 | / | / |
| Sugar beads 4 | / | / | / | 60 | / |
| Sugar beads 5 | / | / | / | / | 89.5 |
| Liquid essence | 6 | 6 | 15 | 20 | 1 |
| Microcapsule essence | / | / | 1 | 3 | 4 |
| Mineral oil | / | / | 1 | 1 | 1 |
| Silica | 3 | 3 | 9 | 15 | 3.5 |
| HEDP-2Na | / | 1 | 0.6 | 1 | 1 |

A method for preparing a clothing aroma-enhancing bead composition in Examples 1-5 includes the following steps, which were carried out at room temperature:

(1) adding sugar beads to a stirring pot, and slowly adding liquid essence for uniform stirring in a stirring state;

(2) then, adding microcapsule essence (when a formula includes the raw material) and HEDP-2Na (when the formula includes the raw material);

(3) then, slowly adding silica to the stirring pot, and conducting stirring continuously until the surfaces of water-soluble granules are uniformly coated with the adsorbent (silica) and the liquid essence; and (4) then, adding corresponding mineral oil (when the formula includes the raw material), and conducting uniform stirring.

Comparative Example 1

According to a current common technical solution in this comparative example, clothing aroma-enhancing granules produced by using PEG as a carrier are provided and include the following composition in percentage by weight: 6% of liquid essence and 94% of PEG8000. A production process includes heating the PEG8000 to 80° C. for melting the same into a liquid, adding the essence for uniform stirring to obtain a slurry, maintaining the slurry at about 70° C. by heat preservation measures, and producing hemispherical granules by a distributor.

Comparative Example 2

According to another technical solution in this comparative example similar to the present invention, a product using water-soluble sea salt as a carrier is provided and includes the following composition in percentage by weight: 6% of liquid essence, 3% of silica, and 91% of sea salt granules. A production process includes adding the sea salt granules to a stirring pot, adding the essence, and then adding the silica for uniform stirring. A loading technology used in Comparative Example 2 is a normal temperature preparation technology.

An aroma-retaining test and a water solubility test are carried out on care compositions in examples and comparative examples.

I. Aroma Test

1. Stage Aroma Test of Products:

A survey test was carried out after consumers were organized, and the aroma intensity and preference of products were rated by the consumers. Scores of the aroma intensity are set as follows: 1 score indicates that the aroma is too light, 2 scores indicate that the aroma is a little light, 3 scores indicate that the aroma is moderate, 4 scores indicate that the aroma is a little strong, and 5 scores indicate that the aroma is too strong. A final average score closer to 3 indicates that the concentration performance of a product is more reasonable. Scores of the aroma preference are set as follows: 1 score indicates that the aroma is extremely unfavorable, 2 scores indicate that the aroma is a little unfavorable, 3 scores indicate that the aroma is favorable or unfavorable, 4 scores indicate that the aroma is a little favorable, and 5 scores indicate that the aroma is extremely favorable. A higher final average score indicates that the aroma is more popular. Test results are as follows.

TABLE 3

| Product aroma test | | |
|---|---|---|
| Sample | Product preference | Product aroma intensity |
| Comparative Example 1 | 4.4 | 3.1 |
| Comparative Example 2 | 3.0 | 4.3 |
| Example 1 | 4.2 | 3.5 |
| Example 2 | 4.3 | 3.2 |
| Example 3 | 3.5 | 4.2 |
| Example 4 | 3.2 | 4.3 |
| Example 5 | 4.5 | 3.1 |

In Comparative Example 1, Comparative Example 2, Example 1 and Example 2, all the added amounts of the essence are 6%. From the above table, it can be seen that the product using the sea salt as a carrier in a comparative example has high aroma intensity, the consumers believe that the product has a too strong aroma, and as a result, the preference is low. However, the products using the sugar granules as a carrier in Example 1 and Example 2 have better compatibility with aromas, the aromas can be locked to avoid too much release, and as a result, the preference is better than that of the product prepared by the same loading technology in Comparative Example 2.

2. Clothing Aroma-Retaining Test

The products with a concentration of 1% in various examples and comparative examples were separately dissolved in a water basin. A towel was added for soaking for 10 minutes, taken out, wrung out, rinsed with clean water twice, and air-dried naturally. Then, the preference and concentration of an aroma of the towel were evaluated by trained evaluators. Scores of the aroma intensity are set as follows: 1 score indicates that the aroma is too light, 2 scores indicate that the aroma is a little light, 3 scores indicate that the aroma is moderate, 4 scores indicate that the aroma is a little strong, and 5 scores indicate that the aroma is too strong. A final average score closer to 3 indicates that the concentration performance of a product is more reasonable. Scores of the aroma preference are set as follows: 1 score indicates that the aroma is extremely unfavorable, 2 scores indicate that the aroma is a little unfavorable, 3 scores indicate that the aroma is favorable or unfavorable, 4 scores indicate that the aroma is a little favorable, and 5 scores indicate that the aroma is extremely favorable. A higher final average score indicates that the aroma is more popular. Test results are as follows.

TABLE 4

| Clothing aroma-retaining test | | |
|---|---|---|
| Sample | Aroma-retaining preference score | Aroma-retaining intensity score |
| Comparative Example 1 | 3.8 | 2.5 |
| Comparative Example 2 | 4.0 | 2.9 |
| Example 1 | 4.2 | 3.1 |
| Example 2 | 4.4 | 3.0 |
| Example 3 | 4.6 | 3.2 |
| Example 4 | 4.8 | 3.2 |
| Example 5 | 4.6 | 3.3 |

From Table 4, it can be seen that the added amounts of the essence in Examples 1-2 and Comparative Examples 1-2 are the same, and the products in Examples 1-2 are obviously better than the product in Comparative Example 1. As the product in Comparative Example 1 is prepared by a heating process, the liquid essence is volatilized in a preparation process, and as a result, the aroma-retaining intensity is affected. The sea salt is used as a carrier in Comparative Example 2, and the products in Examples 1-2 are also obviously better than the product in Comparative Example 2, indicating that the sugar granules are more conducive to the release of the essence in an aqueous solution. Through further comparison of Examples 4 and 5, it can be seen that by using the microcapsule essence, the aroma-retaining effect of clothing products can be significantly improved, and the use amount of the liquid essence is reduced.

II. Dissolution Rate Test

A test method includes adding 500 mL of deionized water to a 500 mL beaker, then adding 1 g of a sample, and observing the time for complete dissolution of the sample in a static state. Results are as shown in Table 5 below.

Complete dissolution means that the sample is completely dissolved in water.

TABLE 5

| Sample | Dissolution time (mm) |
|---|---|
| Comparative Example 1 | 6 |
| Example 1 | 3 |
| Example 2 | 3 |
| Example 3 | 3 |
| Example 4 | 3 |
| Example 5 | 3 |

The experimental results in Table 5 show that the products in technical solutions of the present invention have better solubility than that in the prior art.

III. Survey of Appearance Preference of Products

A consumer survey was carried out on the appearance preference of products, and 30 consumers were invited to rate and evaluate the appearance of the products. 1 score indicates that the appearance is extremely unfavorable, 2 scores indicate that the appearance is a little unfavorable, 3 scores indicate that the appearance is favorable or unfavorable, 4 scores indicate that the appearance is a little favorable, and 5 scores indicate that the appearance is extremely favorable. Then, comprehensive average score results are as shown in Table 6 below.

TABLE 6

| Sample | Appearance preference score |
|---|---|
| Comparative Example 1 | 3.8 |
| Comparative Example 2 | 3.0 |
| Example 1 | 14.0 |
| Example 2 | 4.3 |
| Example 3 | 4.3 |
| Example 4 | 4.3 |
| Example 5 | 4.5 |

Table 6

Compared with comparative examples, the appearance of the products in Examples 1-5 of the present invention is more popular among consumers, and after the mineral oil is added in Examples 2-5, the appearance is glossy and is more popular among consumers than that in Example 1.

IV. Investigation of the Stability of Products

The products were stood in an oven at 45° C. for 1 month, high-temperature samples and normal-temperature samples were photographed, and then, color differences between the two kinds of samples were calculated by a computer. Greater color differences indicate that the surfaces of the products have greater changes. Experimental results are as follows.

TABLE 7

| Sample | Color differences between high-temperature samples and normal-temperature samples | High-temperature samples observed by naked eyes |
|---|---|---|
| Comparative Example 1 | 5.0 | Great yellowing |
| Comparative Example 2 | 4.0 | Great yellowing |
| Example 1 | 2.0 | Little yellowing |
| Example 2 | 2.0 | Little yellowing |
| Example 3 | 1.0 | Slight yellowing |
| Example 4 | 1.0 | Slight yellowing |
| Example 5 | 1.0 | Slight yellowing |

According to the results in Table 7, it can be seen that the PEG used as a carrier is not compatible with the essence, and yellowing is likely to be caused under high temperature conditions. It is inferred that yellowing of the essence may be caused by some intermediate products and catalyst residues in a PEG synthesis process. The sea salt is used as a carrier in Comparative Example 2, and yellowing of the essence may be caused by some metal impurities in the sea salt. The sugar granules used have better stability with the essence, and the phenomenon of yellowing can be better reduced by adding HEDP-2Na.

Various technical features of the above embodiments may be combined in any manner, and all possible combinations of the technical features in the above embodiments are not completely described for the sake of brief description. However, all the combinations of the technical features shall be considered as falling within the recorded scope of the specification as long as they are not contradictory to each other.

Only several implementations of the present invention are expressed in the above embodiments, which are described specifically in detail, but are not construed as limitations of the scope of the invention patent. It shall be noted that a variety of transformations and improvements can be made by a person of ordinary skill in the art without departing from the concept of the present invention, and all the transformations and improvements fall within the protection scope of the present invention. Therefore, the protection scope of the invention patent shall be defined by the attached claims.

What is claimed is:

1. A clothing aroma-enhancing bead composition, wherein the clothing aroma-enhancing bead composition comprises the following components in percentage by weight:

A) 60-95% of sugar granules wherein the sugar granules are spherical granules with a diameter of 1-4.0 mm, and comprise the following components in percentage by weight:

i) 10-30% of a sugar core selected from the group consisting of sucrose, glucose, sodium citrate, or mixtures thereof;

ii) 20-60% of an adhesive which is an aqueous solution selected from the group consisting of sucrose, glucose, glucose syrup, maltose syrup, or mixtures thereof; and iii) 20-50% of a sugar powder selected from the group consisting of starch, sucrose, glucose, maltodextrin, or mixtures thereof, wherein of these three components, at least two have different compositions;

B) 1.0-20% of liquid essence, aka perfume; and

C) 0.5-20% of silica; wherein the clothing aroma-enhancing bead composition has the sugar granules as the core, and the core is coated with the liquid essence and the silica.

2. The clothing aroma-enhancing bead composition according to claim 1, wherein the clothing aroma-enhancing bead composition further comprises, in percentage by weight, 0.1-2% of mineral oil, and a kinematic viscosity of the mineral oil at 40° C. is 1-30 mm2/s.

3. The clothing aroma-enhancing bead composition according to claim 2, wherein the clothing aroma-enhancing bead composition further comprises, in percentage by weight, 0.1-5% of disodium hydroxyethylidene diphosphonate.

4. The clothing aroma-enhancing bead composition according to claim 3, wherein the clothing aroma-enhancing bead composition further comprises, in percentage by weight, 0.1-10% of microcapsule essence wrapped with a fragile hydrophobic material.

5. A method for preparing the clothing aroma-enhancing bead composition according to claim 1, wherein the method comprises: in room temperature, adding the sugar granules to a mixing and stirring pot in proportion, putting the liquid essence for uniform stirring, and then adding the silica for stirring until no powder obviously exists.

6. The method for preparing the clothing aroma-enhancing bead composition according to claim 5, wherein the sugar granules are prepared by a rotary coating pot device.

* * * * *